United States Patent [19]
Oyamatsu et al.

[11] Patent Number: 5,560,998
[45] Date of Patent: Oct. 1, 1996

[54] MAGNETO-OPTICAL RECORDING MEDIUM

[75] Inventors: Atsushi Oyamatsu; Kazutomi Suzuki, both of Hino; Kiyoshi Chiba, Chofu, all of Japan

[73] Assignee: Teijin Limited, Osaka, Japan

[21] Appl. No.: 284,295

[22] Filed: Aug. 3, 1994

Related U.S. Application Data

[63] Continuation of Ser. No. 676,011, Mar. 27, 1991, abandoned.

[30] Foreign Application Priority Data

| Mar. 27, 1990 | [JP] | Japan | 2-75431 |
| Aug. 29, 1990 | [JP] | Japan | 2-225158 |

[51] Int. Cl.⁶ ........................... G11B 5/66
[52] U.S. Cl. .................. 428/694 ML; 428/694 DE; 428/694 NF; 428/694 XS; 428/694 RL; 428/694 MT; 428/900; 501/96; 369/13
[58] Field of Search ............ 428/694 DE, 694 NF, 428/694 XS, 694 RL, 694 MT, 900, 694 ML; 501/96; 369/13

[56] References Cited

U.S. PATENT DOCUMENTS

| 4,680,742 | 7/1987 | Yamada et al. | 369/13 |
| 4,741,967 | 5/1988 | Yoshihara et al. | 428/469 |
| 4,786,559 | 11/1988 | Murakami et al. | 428/694 DE |
| 5,093,174 | 3/1992 | Suzuki et al. | 428/64.3 |
| 5,192,626 | 3/1993 | Sekiya et al. | 428/694 R |

FOREIGN PATENT DOCUMENTS

| 0239390 | 9/1987 | European Pat. Off. | G11B 7/24 |
| 0331737 | 9/1989 | European Pat. Off. | G11B 11/10 |
| 350010 | 1/1990 | European Pat. Off. | |
| 116990 | 7/1984 | Japan . | |
| 60-145525 | 8/1985 | Japan . | |
| 19745 | 1/1986 | Japan . | |
| 61-11950 | 1/1986 | Japan . | |
| 34747 | 2/1986 | Japan . | |
| 62-226449 | 10/1987 | Japan . | |
| 63-255856 | 10/1988 | Japan . | |
| 63-255855 | 10/1988 | Japan . | |
| 171629 | 5/1989 | Japan . | |
| 213849 | 8/1989 | Japan . | |
| 137382 | 1/1991 | Japan . | |

OTHER PUBLICATIONS

Yoneyama et al., "Effect of the Thermal Interference in Thermomagnetically Recorded Domains," IEEE Transactions on Magnetics, vol. 25, No. 5, Sep. 1989.

European Search Report.

*Primary Examiner*—Leszek Kiliman
*Attorney, Agent, or Firm*—Sughrue, Mion, Zinn, Macpeak & Seas

[57] ABSTRACT

A magneto-optical recording medium, comprising a substrate, a magneto-optical recording layer on the substrate, a transparent thermally-insulating layer of one selected from the group consisting of tantalum oxynitride and tantalum oxide on the magneto-optical recording layer, and a metal reflecting layer on the transparent thermally-insulating layer, the metal reflecting layer having a thermal conduction represented by a product of a thermal conductivity multiplied by a layer thickness of not less than $1.3 \times 10^{-6} WK^{-1}$. Heat dispersion is improved while maintaining a high recording sensitivity.

23 Claims, 3 Drawing Sheets

T₁ = 90nsec
T₂ = 270nsec
T₃ = 900nsec

SIGNAL FOR RECORDING

REPRODUCED SIGNAL 5,560,998

MAGNETO-OPTICAL RECORDING MEDIUM

This is a continuation of application Ser. No. 07/676,011 filed Mar. 27, 1991 now abandoned.

BACKGROUND OF THE INVENTION

1. Field of the Invention

The present invention relates to a magneto-optical recording medium in which information is recorded, reproduced and erased by a light such as a laser beam. More specifically, the present invention relates to a magneto-optical recording medium having a metal reflecting layer.

2. Description of the Related Art

Optical recording media are being investigated and developed because of their high density recording and large storage capacity. Particularly, a magneto-optical recording medium is desired and various materials and systems therefor have been published because of its wide applicability to various fields.

A typical magneto-optical recording medium comprises a magneto-optical recording layer of an amorphous rare earth metal-transition metal alloy formed on a transparent substrate, the magneto-optical recording layer having an axis of easy magnetization perpendicular to the layer.

Since the magneto-optical recording layer of the amorphous alloy magnetic layer is easily oxidized and has a small Kerr rotation angle, resulting in an unsatisfactory C/N (carrier/noise) ratio of a reproduced signal, and so various proposals have been made to solve these problems.

For example, a four layer construction of a substrate/a transparent dielectric layer/a recording layer/a transparent dielectric layer/a metal reflecting layer in this order allows a utilization of Faraday and Ker effects together with a Kerr enhancement effect by the dielectric layer, thereby providing a high C/N ratio, and the four layer construction also provides a high durability by using the metal nitride as the dielectric layer. By providing a metal reflecting layer, the recording sensitivity is lowered in comparison with the case without the reflecting layer. To obtain an adequate recording sensitivity, there is a proposal to lower the thermal conduction of the metal reflecting layer by controlling the thickness of the metal layer or adding an additive to the metal layer.

Nevertheless, the present inventors found that in the above four layer construction, if the thermal conduction of the metal reflecting layer is made lower, the recording sensitivity is improved but several problems occur. For example, when information is being recorded, a large shift or dislocation of a recording bit from a position to be recorded occurs by a thermal influence between the neighboring bits. This bit shift can be detected as a shift of the peak position of the reproduced signal. The larger the shift of the bit is, the larger the peak shift is and more an error in reproduction occurs. Further, during erasing of information in which a high power laser beam is irradiated, the recording layer may be deteriorated by an over-heat if the construction of the medium does not allow a disperse of heat. In fact, in an inventors' investigation, the C/N ratios of media were often lowered when a continuous wave erasure laser beam (high power) was irradiated. Namely, there is a problem of a medium in a long term stability against a laser beam.

The object of the present invention is to solve the above problems and to provide a magneto-optical recording medium having the advantageous characteristics derived from the transparent dielectric layer and the metal reflecting layer while having a high C/N ratio and recording sensitivity as well as a low error rate of reproduced information and an excellent long term stability against a laser beam.

SUMMARY OF THE INVENTION

The above object of the present invention is attained by a magneto-optical recording medium comprising a substrate, a transparent dielectric layer, a magneto-optical recording layer and a metal reflecting layer in this order, in which at least a transparent heat insulating layer of a tantalum oxynitride or oxide is inserted between the magneto-optical recording layer and the metal reflecting layer, and the metal reflecting layer is selected so as to have a product of a thermal conductivity multiplied by a thickness thereof of not less than $1.3 \times 10^{-6} WK^{-1}$.

DESCRIPTION OF THE PREFERRED EMBODIMENTS

Figure 1:
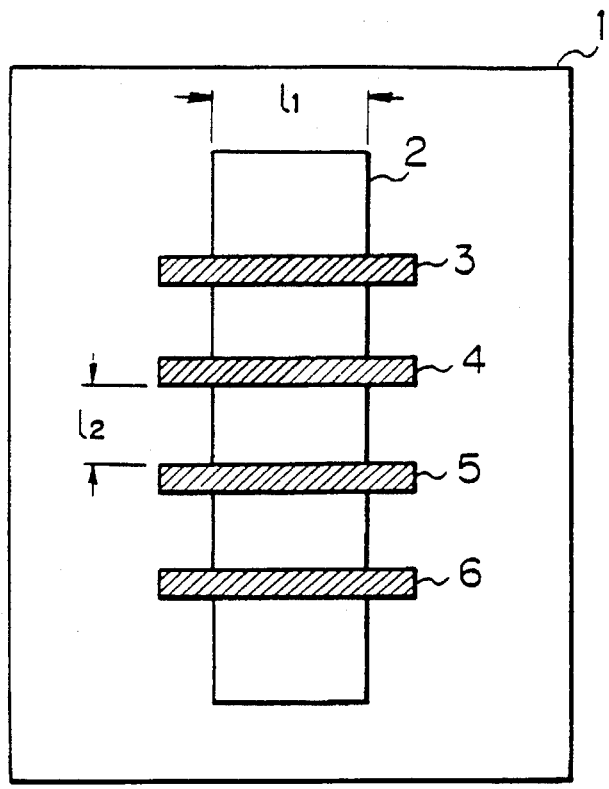
FIG. 1 illustrates measuring of the thermal conductivity of a metal layer by the four terminal method.

One of the reasons for the above mentioned shift of bits during recording information, that is, the peak shift, is considered to be a thermal interference between the neighboring bits. Namely, it is considered that when the magneto-optical recording layer is heated above a temperature necessary for recording, the heat diffuses to the neighboring bits and affects its shape or position. Further, the reason for the lowering of the C/N ratio when a continuous wave erasure laser beam is irradiated with is also an over-heating of the magneto-optical recording layer above a temperature necessary for erasing.

Therefore, to prevent the undesirable over-heat, a construction in which heat dispersion is improved is necessary, but only improving the thermal conductivity or only thickening of the metal reflecting layer result in a lowering of the recording sensitivity. Accordingly, considering the recording sensitivity together with a small peak shift and an excellent long term stability against an erasure laser beam, a construction in which the temperature of the recording layer is easily elevated to a certain temperature (a recording temperature) but is difficult to elevate more than that temperature so that an undesirable over-heat is prevented should be created.

To obtain the above construction, the inventors made attention to a combined construction in which the over-heat is prevented by a metal reflecting layer having an excellent heat dispersion, and the lowering of the recording sensitivity is presented by a heat insulating layer having such an excellent heat insulation provided between the recording layer and the metal reflecting layer. Then, the inventors confirmed that by inserting a layer of tantalum oxynitride (hereinafter referred to as "TaON") or tantalum oxide (hereinafter referred to as "TaO") having an excellent heat insulation as the transparent heat insulating layer between the metal reflecting layer and the magneto-optical recording layer and by thickening the metal reflecting layer to improve the thermal conduction of the metal reflecting layer, a magneto-optical recording medium having a high C/N ratio, a high recording sensitivity, a small peak shift of reproducing signal, and an excellent long term stability against a high power laser beam could be obtained.

In the above construction, the temperature of the magneto-optical recording layer can be easily elevated because of the heat insulation of the TaON or TaO having an extremely low thermal conductivity, thereby allowing a high recording sensitivity. This heat insulation or a high recording sensitivity is obtainable even if the metal reflecting layer used has a considerably high thermal conduction and by this metal reflecting layer having a considerably high thermal conduction, an excess heat is dispersed and a too much over-heat is prevented. (The thickness of the heat-insulating layer or transparent dielectric layer is selected to obtain an enhancement of the Kerr effect and in this thickness of the transparent dielectric layer, it is desirable that the transparent dielectric layer has as a low thermal conduction or a high heat insulation as possible, in combination with a high thermal conduction of the metal reflecting layer. In this respect, the TaON or TaO has a preferably low thermal conduction or a preferably high heat insulation among possible transparent dielectric materials. The low thermal conductivity of the TaON or TaO does not prevent a necessary heat dispersion by the metal reflecting layer.) Furthermore, a high transparency of TaON or TaO also attributes to a high C/N ratio of the recording medium. Thus, in accordance with the present invention, a high C/N ratio, a high sensitivity, a low peak shift, and a long term stability against a high power laser beam are obtained.

In a preferred embodiment, another transparent dielectric layer of a metal nitride may be inserted between the magneto-optical recording layer and the transparent heatinsulating layer, in order to prevent an oxidation of a magneto-optical recording layer which is possible when a TaON or TaO layer is prepared in direct contact with the magneto-optical recording layer, depending on a method of depositing a TaON or TaO layer (for example, an effect of pre-sputtering prior to preparing a TaON or TaO layer).

The thickness of the another transparent dielectric layer is preferably thinner as long as it prevents an oxidation of the magneto-optical recording layer, to allow as a larger thickness as possible of the heat insulating layer, and is generally 2 to 15 nm, preferably 2 to 10 nm, since the total thickness of this additional transparent dielectric layer of e.g., $Si_3N_4$ or AlSiN and the transparent heat insulating layer of TaON or TaO is determined so as to obtain an enhancement of the Kerr effect.

A preferred TaON, i.e., tantalum oxynitride in the present invention comprises 1 to 45 atomic %, more preferably 1 to 35 atomic % of nitrogen and 27 to 72 atomic %, more preferably 35 to 72 atomic % of oxygen, the remainder being tantalum, because of its transparency and heat insulation, although elements other than Ta, O and N may be contained in an mount of an order of impurity. The method for forming a TaON layer may be any thin film preparing method, including known PVD such as vacuum evaporation method, sputtering methods etc., or CVD. Among them, a reactive sputtering method using a $Ta_2O_5$ target and a mixed gas of Ar and $N_2$, or a reactive sputtering using a Ta target and a mixed gas of Ar, $N_2$ and $O_2$ is preferred because of less extraordinary arc discharge and high deposition rate and thus stable operation and a high productivity.

A preferred TaO in the present invention comprises 20 to 45 atomic % of Ta because of its transparency and heat insulation, the remainder being oxygen. The TaO layer may be prepared by various thin film preparing methods as mentioned above. In preparing a TaO film, a reactive sputtering using a Ta or $Ta_2O_5$ target with a mixed gas of Ar and $O_2$ as well as a reactive sputtering using a $Ta_2O_5$ target with Ar gas alone may be considered. However, a sputtering method using Ar gas only is not practically applicable because the transparency of the layer prepared is poor.

The TaO prepared by sputtering method using a mixed gas of Ar and $O_2$ has a heat insulation and transparency almost equal to those of TaON and therefore may be applicable to the present invention in the same as TaON. Nevertheless, in preparing a TaO film, oxygen gas must be introduced in a vacuum chamber, while in preparing a TaON film, a mixed gas of Ar and N with a $Ta_2O_5$ target can be used, to obtain a transparent layer. Therefore, TaON is superior to TaO when considering the deposition process, because the magneto-optical recording layer is not in contact with oxygen in the TaON formation process.

The thickness of the transparent heat insulating layer is preferably 5 to 50 nm, more preferably 10 to 40 nm considering the enhancement of the Kerr effect, although the thicker the thickness, the more the heat insulation.

In the present invention, the metal reflecting layer has an important role of dispersing heat and it provides a larger effect of the invention if it has a higher thermal conduction. The thermal conduction of the metal reflecting layer is further improved when the thermal conductivity of the layer is higher and the thickness of the layer is thicker. In accordance with the investigation by the inventors, it was found that the effect of the present invention can be considered or compared by the value of a product of the thermal conductivity multiplied by the thickness of the layer. Thus, when the thermal conduction of the metal reflecting layer is defined by this product, in accordance with the present invention, the value of a product of the thermal conductivity multiplied by the thickness of the metal reflecting layer should be not less than $1.3 \times 10^{-6} WK^{-1}$ preferably not less than $2.0 \times 10^{-6} WK^{-1}$, more preferably not less than $3.0 \times 10^{-6} WK^{-1}$.

Note that the thermal conductivity of the metal reflecting layer is determined by the following procedures. Namely, referring to FIG. 1, a metal layer 2 to be measured is prepared on a glass substrate 1 and has a width ($l_1$) of 10 mm and a thickness (d) of 100 nm. Four Au electrodes 3 to 6 are deposited with an equal space on the metal layer 2, the spacing ($l_2$) between the electrodes being 4 mm. The electric resistance (R) of the metal layer 2 is measured by the four terminal method and the electric conductivity ($\sigma$) and the thermal conductivity (k) are determined by the following formulae, where L represents the Lorenz number and T represents the measured temperature, and L and T are made $2.45 \times 10^{-8}$ $W\Omega/K^2$ and 300K., respectively.

$$\sigma = (1/R) \times (l_2/l_1 d)$$

$$k = L \times T \times \sigma$$

Examples of thus obtained electric and thermal conductivities of an Al layer and an AgAuTi and AlAuTi alloy layers described later in Examples are shown in Table 1.

TABLE 1

Electric and thermal conductivities of metal layers

|  | Electric conductivity ($\Omega^{-1}m^{-1}$) | Thermal conductivity ($Wm^{-1}K^{-1}$) |
| --- | --- | --- |
| Al | $1.6 \times 10^7$ | $1.2 \times 10^2$ |
| $Ag_{95.0}Au_{4.1}Ti_{0.9}$ | $7.9 \times 10^6$ | $5.8 \times 10^1$ |
| $Al_{92.7}Au_{4.8}Ti_{2.5}$ | $1.8 \times 10^6$ | $1.3 \times 10^1$ |

The material of the metal reflecting layer is preferably a metal having a high thermal conductivity, from the reasons described before, and Ag, Au, Al, Cu or an alloy containing any of these metals as a main component is preferably used. Since these metals have a high reflectivity of light, an advantage of a high C/N ratio is obtained. Among those, AgAu and AlAu alloys are superior in reflectivity of light, thermal conductivity and durability, and these alloys further containing Ti are further preferred for the durability.

The thickness of the metal reflecting layer is selected so as to control the heat dispersion to an adequate range. If the thermal conductivity thereof is low, the thickness should be thick. If the thermal conductivity is high, the thickness may be thin.

The metal reflecting layer may be prepared by a conventional method, including sputtering and vacuum evaporation.

The magneto-optical recording layer of the present invention may be any one which allows recording, reproducing and erasing by the thermomagnetic effect and the magneto-optical effect, more specifically a magnetic metal layer in which the axis of easy magnetization is perpendicular to the layer and a reverse magnetic domain can be created optionally so that recording and erasing can be made by the thermomagnetic effect. For example, a layer of amorphous alloys of a rare earth element and transition metal element such as TbFe, TbFeCo, GdTbFe, GdFeCo, NdDyFeCo, NdDyTbFeCo, NdFe, PrFe and CeFe, a double-layer of these layers utilizing an exchang coupling interaction, an artificial superlattice such as Co/Pt, Co/Pd, etc. may be used.

The substrate may be made of a polymer resin such as polycarbonate resin, acrylic resin, epoxy resin, 4-methylpentene resin or a copolymer thereof, or amorphous polyolefin or glass. The polycarbonate resin is preferred because of mechanical strength, environmental stability, thermal stability and humidity permeability.

The above description concerns the basic construction of a magneto-optical recording medium of the present invention which is not limited thereto. Particularly, it is preferred that another transparent dielectric layer is inserted between the substrate and the magneto-optical recording layer to obtain an enhancement of the Kerr effect. The transparent dielectric layers are preferably made of silicon nitride or aluminum silicon nitride because they have a high durability under a high temperature and high humidity.

Usually, on the metal reflecting layer, an organic protecting layer of an organic radiation-curing or thermo-setting resin is generally provided in order to provide a mechanical protection and an improvement of durability and an inorganic protection layer made of the same dielectric material may be provided between the metal reflecting layer and the organic protecting layer.

The above medium is used as a single-sided medium, which is optionally provided with a protection plate or a protection film, or as a double-sided medium by bonding two such media on the side of the metal 10 reflecting layer.

Thus, in accordance with the present invention, by a combination of a transparent heatinsulating layer and a highly thermally conductive metal reflecting layer, a magneto-optical recording medium in which both characteristics of conflicting peak shift (bit error) and recording sensitivity are improved and a high C/N ratio and a long term stability against a high power laser beam are obtained is provided.

The present invention is further described with reference to Examples. Magneto-optical recording discs of Examples 1 to 7 and Comparative examples 1 to 3 were manufactured and the optimum valve of a recording laser power, C/N ratio and peak shift thereof were measured. Also, the long term stability against a laser beam was determined by measuring a C/N ratio after the disc is irradiated with a continuous laser beam while rotating the disc at a lowered rpm for an adequate rotation number. A rotation number of the disc necessary in lowering of the C/N ratio by 2 dB from the original C/N ratio is used for estimation.

EXAMPLE 1

Figure 2:
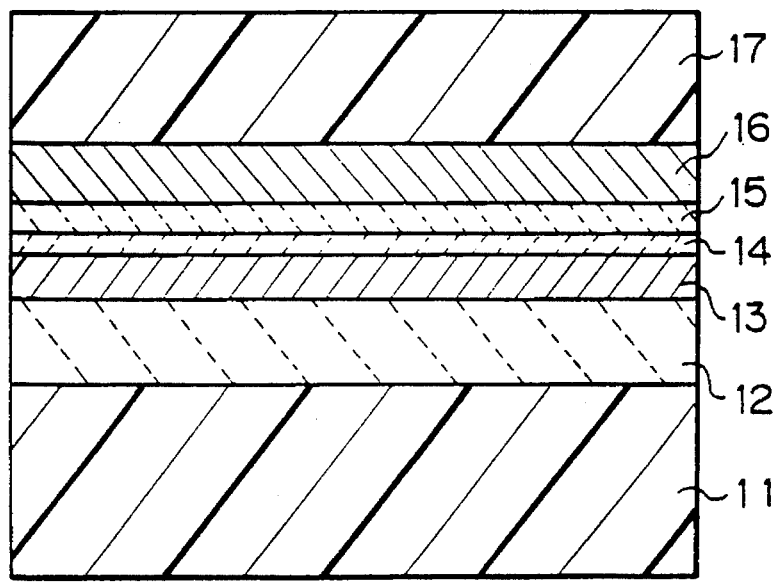
FIGS. 2 to 4 are sectional views of magneto-optical recording discs in Examples and Comparative examples.

A magneto-optical recording medium having a laminate structure as shown in FIG. 2 was made. In FIG. 2, the reference numeral 11 denotes a transparent substrate, 12 a transparent dielectric layer, 13 a magneto-optical recording layer, 14 a transparent dielectric nitride layer, 15 a transparent heat insulating layer, and 16 a metal reflecting layer.

A disc-like substrate 11 of polycarbonate (PC) resin having a diameter of 130 mm and a thickness of 1.2 mm and having grooves at a pitch of 1.6 μm was mounted in a vacuum chamber of a magnetron sputtering equipment (ANELVA Corporation SPF-430H) capable of mounting three targets, and the chamber was evacuated to less than $4 \times 10^{-7}$ Torr.

A mixture gas of Ar and $N_2$ (Ar:$N_2$=70:30 by volume) was introduced into the chamber and the flow rate of the gas mixture was regulated to a pressure of 10 mTorr. An AlSiN layer (112.5 nm thick) as the transparent dielectric layer 12 was deposited by RF sputtering, using a target of a sintered $Al_{30}Si_{70}$ (a diameter of 100 mm and a thickness of 5 mm) and a glow discharge at an RF power of 500 W of 13.56 MHz, while rotating the PC substrate.

The thus deposited layer 12 had a composition of $Al_{19}Si_{39}N_{42}$ when analyzed by an Auger electron spectrometer (provided by Perkin-Elmer Co. as PHI-SAM 610).

Then a $Tb_{20.5}Fe70.9Co_{8.6}$ alloy layer (22.5 nm thick) as the magneto-optical recording layer 13 was deposited on the AlSiN layer 12 by DC sputtering a $Tb_{19}Fe_{72.5}Co_{8.5}$ alloy target (a diameter of 100 mm and a thickness of 4.5 mm) at an Ar gas pressure of 4 mTorr and a glow discharge power of 150 W.

The composition of the alloy layer was determined by an inductivity coupled plasma spectrometry (ICP). The compositions of the other alloys were also determined by the ICP.

Then an AlSiN layer was deposited under the same conditions as above to form the transparent dielectric nitride layer 14 (5 nm thick).

Then, a target was changed from $Al_{30}Si_{70}$ to $Ta_2O_5$, an evacuation of the chamber was effected to less than $4 \times 10^{-7}$ Torr and a mixture gas of Ar and $N_2$ (Ar:$N_2$=70:30 by volume) was introduced into the chamber and the flow rate of the gas mixture was regulated to a pressure of 10 mTorr. The target was a disc of sintered $Ta_2O_5$ 100 mm in diameter and 5 mm in thickness. A sputtering was carried out at an RF power of 400 W of 13.56 MHz, to deposit a TaON layer (30 nm thick) as the transparent heat insulating layer 15. The contents of the oxygen and nitrogen in the layer 15 measured by the Auger electron spectroscopy were 51 atomic % and 21 atomic %, respectively.

A further DC sputtering was effected using an $Ag_{94.5}Au_{4.4}Ti_{1.1}$ alloy target (100 mm diameter and 3 mm thick) at an Ar gas pressure of 2 mTorr and a glow discharge power of 60 W, to deposit an $Ag_{95.5}Au_{4.1}Ti_{0.9}$ alloy layer 70 nm thick as the metal reflecting layer 16.

The PC substrate 11 was rotated at 20 rpm during the above depositions.

Then, on the metal reflecting layer 16, an ultra-violet ray curable phenolic novolak epoxy acrylate resin was coated by a spin coater, which was then cured by irradiation with an ultra-violet ray and an organic protecting layer 17 (about 10 μm thick) was formed.

EXAMPLE 2

Example 1 was repeated and a magneto-optical recording disc was made except that a thickness of the TaON layer was changed to 20 nm and the metal reflecting layer 16 was an $Al_{92.7}Au_{4.8}Ti_{2.5}$ alloy layer (100 nm thick) perpared by DC sputtering using an $Al_{92.5}Au_{4.5}Ti_{3.0}$ target (100 mm diameter and 5 mm thick) at an Ar pressure of 1.5 mTorr and a glow discharge power of 125 w.

EXAMPLE 3

A magneto-optical recording disc was made in the same manner as in Example 2 except that a thickness of the TaON layer was changed to 30 nm and the metal reflecting layer was an $Al_{92.7}Au_{4.8}Ti_{2.5}$ alloy layer having a thickness of 150 nm.

EXAMPLE 4

On the same substrate 11 as in Example 1, under similar conditions as in Example 1 or 2, an AlSiN layer (100 nm thick) as the transparent dielectric layer 12, a TbFeCo amorphous alloy layer (22.5 nm thick) as the magneto-optical recording layer 13, an AlSiN layer (5 nm thick) as the transparent dielectric nitride layer 14, an TaON layer (30 nm thick) as the transparent heat insulating layer 15, and an $Al_{92.7}Au_{4.8}Ti_{2.5}$ alloy layer (210 nm thick) as the metal reflecting layer 16 were laminated in this order. An organic protecting layer 17 was formed on the metal reflecting layer 16 and a magneto-optical recording disc was made.

EXAMPLE 5

A magneto-optical recording disc as shown in FIG. 2 was made.

On the same substrate 11 as in Example 1, under similar conditions as in Example 1, an AlSiN layer (112.5 nm thick) as the transparent dielectric layer 12, a TbFeCo amorphous alloy layer (22.5 nm thick) as the magneto-optical recording layer 13, an AlSiN layer (5 nm thick) as the transparent dielectric nitride layer 14, an TaO layer (30 nm thick) as the transparent heat insulating layer 15, and an $Ag_{95.0}Au_{4.1}Ti_{0.9}$ alloy layer (70 nm thick) as the metal reflecting layer 16 were laminated in this order. An organic protecting layer 17 was formed on the metal reflecting layer 16 and a magneto-optical recording disc was made.

The TaO layer was deposited by RF sputtering a sintered $Ta_2O_5$ target (100 mm diameter and 5 mm thick) in a mixed gas of Ar and $O_2$ (Ar:$O_2$=70:30). The RF glow power was 400 W of 13.56 MHz, and the gas pressure was adjusted to 10 mTorr. The composition of the TaO layer was $Ta_{32}O_{68}$ in accordance with the Auger electron spectrometer mentioned before.

EXAMPLE 6

A magneto-optical recording disc was made in the same manner as in Example 1 except that the transparent dielectric layers 12 and 14 under and on the magneto-optical recording layer 13 were a silicon nitride (SIN) layer.

The SiN layer was deposited by RF sputtering a metal Si target (100 mm diameter and 5 mm thick) in a mixed gas of Ar and $N_2$ (Ar:$N_2$=70:30). The RF glow power was 500 W of 13.56 MHz, and the gas pressure was adjusted to 15 mTorr.

The thickness of the SiN layer as the transparent dielectric layer 12 on the substrate side of the recording layer was 112.5 nm and the thickness of the SiN layer as the transparent dielectric nitride layer 14 on the metal reflecting layer side was 5 nm.

The SiN layer comprised 43% nitrogen in accordance with the Auger electron spectrometer mentioned before.

EXAMPLE 7

Figure 3:
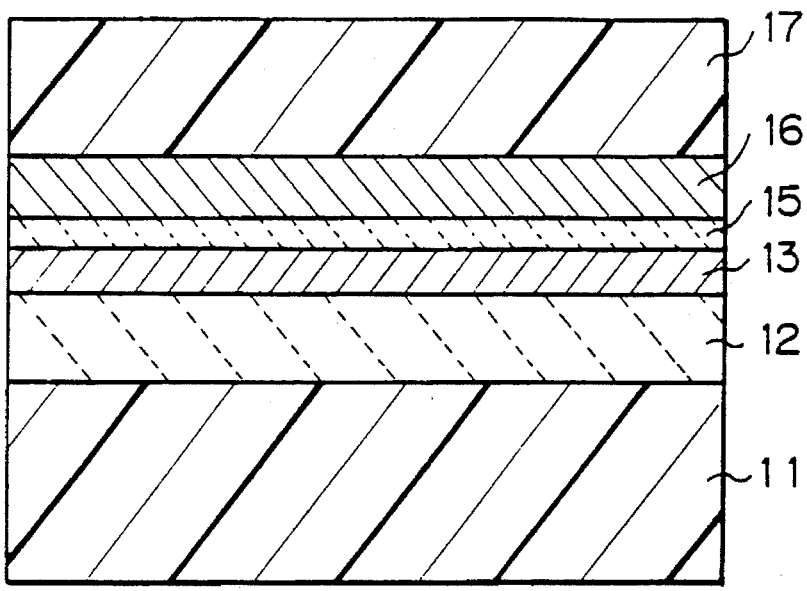

A magneto-optical recording disc as shown in FIG. 3 was made. In FIG. 3, the same reference numerals denote the same parts as in FIG. 2. The magneto-optical recording disc comprised a substrate 11, a transparent dielectric layer 12, a magneto-optical recording layer 13, a transparent heat insulating layer 15, a metal reflecting layer 16, and an organic protecting layer 17.

On the same substrate 11 as in Example 1, under similar conditions as in Example 1, an AlSiN layer (112.5 nm thick) as the transparent dielectric layer 12, a TbFeCo amorphous alloy layer (22.5 nm thick) as the magneto-optical recording layer 13, an TaON layer (35 nm thick) as the transparent heat insulating layer 15, and an $Ag_{95.0}Au_{4.1}Ti_{0.9}$ alloy layer (70 nm thick) as the metal reflecting layer 16 were laminated in this order. An organic protecting layer 17 was prepared on the metal reflecting layer 16. However, a pre-sputtering of the $Ta_2O_5$ target for forming the TaON layer was effected before depositing the TbFeCo amorphous alloy layer, because if the pre-sputtering the $Ta_2O_5$ target is effected after depositing the TbFeCo amorphous alloy layer, the TbFeCo amorphous alloy layer would be deteriorated.

COMPARATIVE EXAMPLE 1

Figure 4:
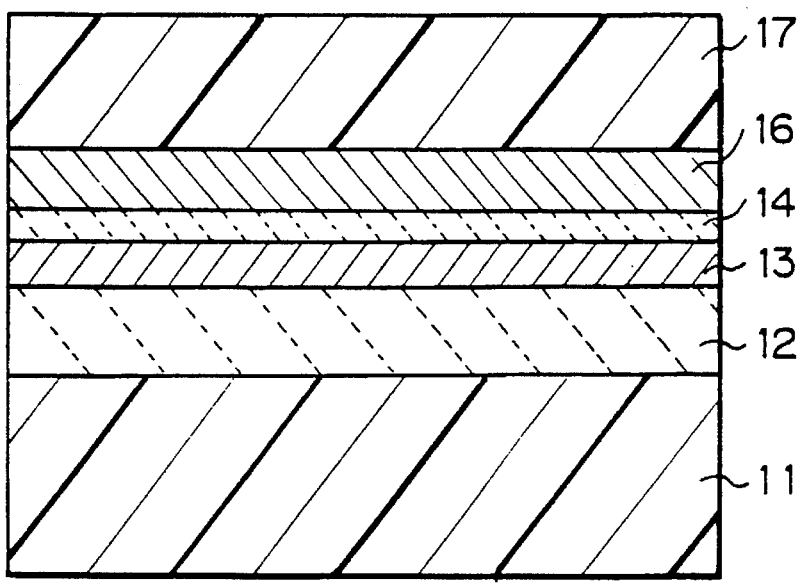

A magneto-optical recording disc as shown in FIG. 4 was made. In FIG. 4, the same reference numerals denote the same parts as in FIG. 2. The magneto-optical recording disc comprised a substrate 11, a transparent dielectric layer 12, a magneto-optical recording layer 13, a transparent dielectric layer 14, a metal reflecting layer 16, and an organic protecting layer 17.

On the same substrate 11 as in Example 1, under similar conditions as in Example 1 or 2, an AlSiN layer (112.5 nm thick) as the transparent dielectric layer 12, a TbFeCo amorphous alloy layer (22.5 nm thick) as the magneto-optical recording layer 13, an AlSiN layer (35 nm thick) as the transparent dielectric layer 14, and an $Al_{92.7}Au_{4.8}Ti_{2.5}$ alloy layer (60 nm thick) as the metal reflecting layer 16 were laminated in this order. An organic protecting layer 17 was formed on the metal reflecting layer 16.

COMPARATIVE EXAMPLE 2

Comparative example 1 was repeated except that the thickness of the metal reflecting layer 16 was changed to 100 nm.

COMPARATIVE EXAMPLE 3

Example 2 was repeated except that the thickness of the TaON layer as the transparent heat insulating layer 15 was changed to 10 nm and the thickness of the AlAuTi layer as the metal reflecting layer 16 was changed to 60 nm.

(1) Then, the C/N ratio and the optimum valve of a recording laser power of the magneto-optical recording discs of Examples 1 to 7 and Comparative examples 1 to 3 were evaluated by a magneto-optical recording and reproducing unit (PULSTEC INDUSTRIAL CO., LTD., DDU-1000 type) under the following conditions. The optimum valve of a recording laser power was determined by varying the power of a semiconductor laser for recording and selecting the power when the second harmonics of the reproducing signal was minimum.

Recording conditions:

| | |
|---|---|
| Disc rotation speed: | 1800 rpm |
| Position of recording on disc: | 30 mm radius |
| Recording frequency: | 3.7 MHz |
| Applied magnetic field during recording: | 250 oersteds |
| Recording pulse width: | 90 nsec |
| Reproducing conditions: | |
| Disc rotation speed: | 1800 rpm |
| Reproducing laser power: | 1.5 mW |

(2) Further, the peak shift of the magneto-optical recording discs of Examples 1 to 7 and Comparative examples 1 to 3 were determined.

Figure 5A:
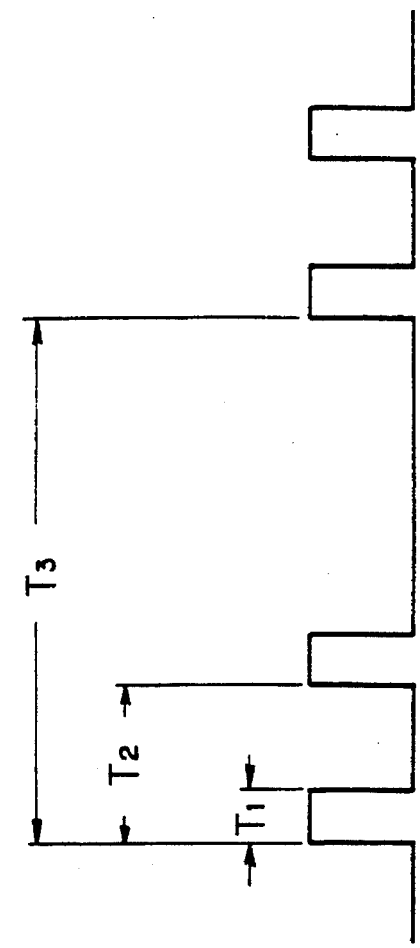
FIGS. 5A and 5B illustrate signal for recording and reproduced signal used in determination of peak shift.
Figure 5B:
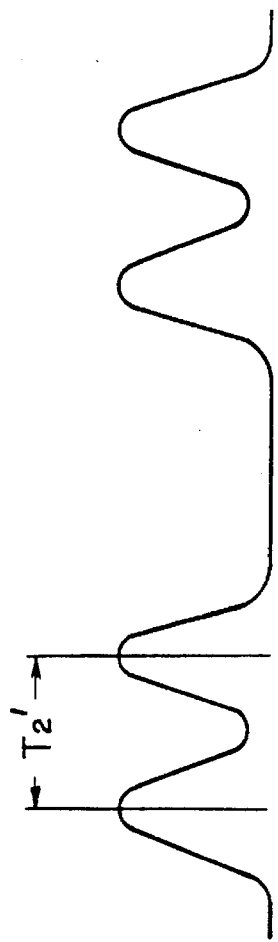

The peak shift measured is an absolute value of a difference between the time $T_2$ between pulses of signal for recording and an average value $T'_2$ of the time $T'_2$ between peaks of reproduced signals, when the signal as shown in FIG. 5A ($T_1$=90 nsec, $\bar{T}_2$=270 nsec, $T_3$=90 nsec) is recorded and the signal as shown in FIG. 5B is reproduced. Therefore, the peak shift is represented by the following formula.

Peak shift=$|T_2-T'_2|$

The recording and reproducing were made by the magneto-optical recording and reproducing unit mentioned above. The conditions for recording and reproducing were the following. The time $T'_2$ between pulses of reproduced signals was measured by a frequency and time interval analyzer (type HP-5371A, produced by Hewlett Packard).

Recording conditions:

| | |
|---|---|
| Disc rotation speed: | 1800 rpm |
| Position of recording on disc: | 30 mm radius |
| Recording laser power: | 6 mW |
| Applied magnetic field during recording: | 250 oersteds |
| Reproducing conditions: | |
| Disc rotation speed: | 1800 rpm |
| Reproducing laser power: | 1.5 mW |

(3) Further, the long term stability against a laser beam of the magneto-optical recording discs of Examples 1 to 7 and Comparative examples 1 to 3 were evaluated.

A laser beam was continuously irradiated to a certain track at a 30 mm radius of the rotating disc and the C/N ratio there was measured after the disc was rotated for a certain number. Thus, the number of the rotation of the disc was determined when the C/N ratio was decreased by 2 dB. If this disc rotation number is larger, the disc is considered to be more stable against a laser beam. The rotation speed of the disc while a continuous wave laser beam was irradiated with was set to be 300 rpm to accelerate the temperature elevation of the magneto-optical recording disc and the power of the continuously irradiated laser beam was 6 mW. The method of measuring the C/N ratio and conditions of recording and reproducing were the same as described before.

The results, i.e., the optimum value of a recording laser power, C/N ratio, peak shift and disc rotation number when the C/N ratio decreased by 2 dB are shown in Table 2.

TABLE 2

| Sample | Construction (thickness, nm) | Thermal conductivity of metal reflecting layer (W/mk) | Optimum recording power (mW) | C/N max (dB) | Peak shift (n sec) | Rotation number when C/N is reduced by 2 dB (cycles) |
|---|---|---|---|---|---|---|
| Ex. 1 | PC/AlSiN/TbFeCo/AlSiN/TaON/AgAuTi<br>112.5  22.5   5    30    70 | $5.8 \times 10$ | 4.5 | 48.6 | 9.6 | $3.4 \times 10^3$ |
| Ex. 2 | PC/AlSiN/TbFeCo/AlSiN/TaON/AlAuTi<br>112.5  22.5   5    20    100 | | 4.5 | 48.5 | 10.2 | $9.0 \times 10^2$ |
| Ex. 3 | PC/AlSiN/TbFeCo/AlSiN/TaON/AlAuTi<br>112.5  22.5   5    30    150 | | 4.5 | 48.4 | 10.0 | $1.8 \times 10^3$ |
| Ex. 4 | PC/AlSiN/TbFeCo/AlSiN/TaON/AlAuTi<br>100    22.5   5    30    210 | $1.3 \times 10$ | 4.5 | 48.4 | 9.5 | $2.7 \times 10^3$ |
| Ex. 5 | PC/AlSiN/TbFeCo/AlSiN/TaO/AgAuTi<br>112.5  22.5   5    30    70 | $5.8 \times 10$ | 4.5 | 48.5 | 9.6 | $3.3 \times 10^3$ |
| Ex. 6 | PC/SiN/TbFeCo/SiN/TaON/AgAuTi<br>112.5  22.5   5    30    70 | $5.8 \times 10$ | 4.5 | 48.4 | 9.6 | $3.3 \times 10^3$ |
| Ex. 7 | PC/AlSiN/TbFeCo/TaON/AgAuTi<br>112.5  22.5   35    70 | $5.8 \times 10$ | 4.5 | 47.8 | 9.7 | $3.3 \times 10^3$ |

TABLE 2-continued

| Sample | Construction (thickness, nm) | Thermal conductivity of metal reflecting layer (W/mk) | Optimum recording power (mW) | C/N max (dB) | Peak shift (n sec) | Rotation number when C/N is reduced by 2 dB (cycles) |
|---|---|---|---|---|---|---|
| Com. Ex. 1 | PC/AlSiN/TbFeCo/AlSiN/AlAuTi<br>112.5 22.5 35 60 | | 4.5 | 48.3 | 12.8 | $2.0 \times 10^1$ |
| Com. Ex. 2 | PC/AlSiN/TbFeCo/AlSiN/AlAuTi<br>112.5 22.5 35 100 | | 5.5 | 48.4 | 10.2 | $7.8 \times 10^2$ |
| Com. Ex. 3 | PC/AlSiN/TbFeCo/AlSiN/TaON/AlAuTi<br>112.5 22.5 5 10 60 | | 4.5 | 48.2 | 12.6 | $2.5 \times 10^1$ |

From Table 2, the following can be seen. Namely, if a transparent heat insulating layer 15 is not used as in Comparative examples 1 and 2, even if the metal reflecting layer 16 is excellent in heat dispersion (Comparative example 2) or not (Comparative example 1), the magneto-optical recording disc cannot satisfy the all characteristics of a high recording sensitivity, and a small peak shift and a long term stability against a laser beam. In Comparative example 1 in which the heat dispersion of the metal reflecting layer 16 is poor, the optimum value of a recording laser power is advantageously low, 4.5 mW, but the peak shift is disadvantageously larger and the C/N ratio is decreased by 2 dB only after 20 rotations. In Comparative example 2 in which the heat dispersion of the metal reflecting layer 16 is excellent, the peak shift is relatively small and the stability against a laser beam is superior to that of Comparative example 1, but the optimum value of a recording laser power is disadvantageously high, 5.5 mW.

It is also seen from Comparative example 3 that even if a transparent heatinsulating layer 15 is used, if a metal reflecting layer 16 has a poor heat dispersion, the advantageous effect of the present invention cannot be obtained.

In sharp contrast, in all Examples 1 to 7 in which a transparent heatinsulating layer 15 and a metal reflecting layer 16 having an excellent heat dispersion are used, the optimum value of a recording laser power is kept to be low, 4.5 mW, while the peak shift and the long term stability against a laser beam are also excellent.

Moreover, it is also seen in Examples 2 to 4 that the more advantageous effects of the present invention can be obtained if the metal reflecting layer 16 used has a more excellent heat dispersion.

From the above, considering that the peak shift and the long term stability against a high power laser beam which are the same degree as those in Example 2 are enough, the effects of the present invention can be obtained by using a transparent heat insulting layer 15 of TaON or TaO and a metal reflecting layer 16 having a thermal conduction equal to or higher than that of the $Al_{92.7}Au_{4.8}Ti_{2.5}$ alloy layer having a thickness of 100 nm. Namely, the value of a product of a thermal conductivity and a layer thickness of a metal reflecting layer is preferably not less than $1.3 \times 10^{-6} WK^{-1}$. If higher effects of the present invention are desired, the thermal conduction should be more than that of the $Al_{92.7}Au_{4.8}Ti_{2.5}$ alloy layer having a thickness of 150 nm and therefore the value of a product of a thermal conductivity and a layer thickness is preferably not less than $2.0 \times 10^{-6} WK^{-1}$.

It is also seen from Examples 1 to 6 that TaON and TaO can be equally used as the transparent heat-insulating layer 15, AlSiN and SiN can be equally used as the transparent dielectric layers 12 and 14, and AgAuTi and AlAgTi alloys can be equally used as the metal reflecting layer 16. Further, the satisfactory effects of the present invention can be obtained even if the TaON layer is prepared in direct contact with the magneto-optical recording layer.

Thus, in accordance with the present invention, the practically important characteristics of a magneto-optical recording medium are significantly improved.

We claim:

1. A magneto-optical recording medium, comprising:

a substrate;

a first transparent dielectric layer on the substrate;

a magneto-optical recording layer on the first transparent dielectric layer;

a transparent heat insulating layer having a thickness of 5 to 50 nm made of a compound selected from the group consisting of tantalum oxynitride and tantalum oxide on the magneto-optical recording layer; and a metal reflecting layer on the transparent heat insulating layer, the metal reflecting layer having a thermal conduction represented by a product of a thermal conductivity multiplied by a layer thickness of not less than $1.3 \times 10^{-6} WK^{-1}$.

2. A magneto-optical recording medium according to claim 1 wherein the metal reflecting layer has a thermal, conduction represented by a product of a thermal conductivity multiplied by a layer thickness of not less than $2.0 \times 10^{-6} WK^{-1}$.

3. A magneto-optical recording medium according to claim 1 wherein the transparent heat insulating layer is tantalum oxynitride essentially comprised of 1 to 45 atomic % nitrogen and 27 to 72 atomic % oxygen, the remainder being tantalum.

4. A magneto-optical recording medium according to claim 1 wherein the medium further comprises a second transparent dielectric layer of a nitride between the magneto-optical recording layer and the transparent heat insulating layer.

5. A magneto-optical recording medium according to claim 2 wherein the metal reflecting layer has a thermal conduction represented by a product of a thermal conductivity multiplied by a layer thickness of not less than $3.0 \times 10^{-6} WK^{-1}$.

6. A magneto-optical recording medium according to claim 2 wherein the transparent heat insulating layer is tantalum oxynitride essentially comprised of 1 to 45 atomic % nitrogen and 27 to 72 atomic % oxygen, the remainder being tantalum.

7. A magneto-optical recording medium according to claim 2 wherein the medium further comprises a second transparent dielectric layer of a nitride between the magneto-optical recording layer and the transparent heat insulating layer.

8. A magneto-optical recording medium according to claim 3 wherein the medium further comprises a second transparent dielectric layer of a nitride between the the magneto-optical recording layer and the transparent heat insulating layer.

9. A magneto-optical recording medium according to claim 4 wherein the metal reflecting layer is made of one selected from the group consisting of Al—Au and Ag—Au alloys.

10. A magneto-optical recording medium according to claim 6 wherein the medium further comprises a second transparent dielectric layer of a nitride between the magneto-optical recording layer and the transparent heat insulating layer.

11. A magneto-optical recording medium according to claim 7 wherein the metal reflecting layer is made of one selected from the group consisting of Al—Au and Ag—Au alloys.

12. A magneto-optical recording medium according to claim 8 wherein the metal reflecting layer is made of one selected from the group consisting of Al—Au and Ag—Au alloys.

13. A magneto-optical recording medium according to claim 10 wherein the metal reflecting layer is made of one selected from the group consisting of Al—Au and Ag—Au alloys.

14. A magneto-optical recording medium according to claim 13 wherein the Al—Au and Ag—Au alloys further contain Ti.

15. A magneto-optical recording medium, comprising:
a transparent substrate of polycarbonate;
a first transparent dielectric layer on the substance, the first transparent dielectric layer being made of a compound selected from the group consisting of aluminum silicon nitride and silicon nitride and having a thickness of 50 to 150 nm;
a magneto-optical recording layer on the second transparent dielectric layer;
a second transparent dielectric layer on the magneto-optical recording layer, the second transparent dielectric layer being made of a compound selected from the group consisting of aluminum silicon nitride and silicon nitride and having a thickness of 2 nm to 15 nm;
a transparent heat insulating layer on the second transparent dielectric layer, the transparent heat insulating layer being made of a compound selected from the group consisting of tantalum oxynitride and tantalum oxide having a thickness of 5 nm to 50 nm; and
a metal reflecting layer on the transparent heat insulating layer, the metal reflecting layer having a thermal conduction represented by a product of a thermal conductivity multiplied by a layer thickness of not less than $1.3 \times 10^{-6} WK^{-1}$.

16. A magneto-optical recording medium according to claim 15 wherein the metal reflecting layer has a thermal conduction represented by a product of a thermal conductivity multiplied by a layer thickness of not less than $2.0 \times 10^{-6} WK^{-1}$.

17. A magneto-optical recording medium according to claim 15 wherein the transparent heat insulating layer is tantalum oxynitride essentially comprised of 1 to 45 atomic % nitrogen and 27 to 72 atomic % oxygen, the remainder being tantalum.

18. A magneto-optical recording medium according to claim 15 wherein the metal reflecting layer is made of one selected from the group consisting of Al—Au and Ag—Au alloys.

19. A magneto-optical recording medium according to claim 16 wherein the transparent heat insulating layer is tantalum oxynitride essentially comprised of 1 to 45 atomic % nitrogen and 27 to 72 atomic % oxygen, the remainder being tantalum.

20. A magneto-optical recording medium according to claim 16 wherein the metal reflecting layer is made of one selected from the group consisting of Al—Au and Ag—Au alloys.

21. A magneto-optical recording medium according to claim 17 wherein the metal reflecting layer is made of one selected from the group consisting of Al—Au and Ag—Au alloys.

22. A magneto-optical recording medium according to claim 19 wherein the metal reflecting layer is made of one selected from the group consisting of Al—Au and Ag—Au alloys.

23. A magneto-optical recording medium according to claim 22 wherein the Al—Au and Ag—Au alloys further contain Ti.

* * * * *